United States Patent
Beugnot et al.

(10) Patent No.: US 12,061,359 B2
(45) Date of Patent: Aug. 13, 2024

(54) PROCESS FOR DELAYING AN OPTICAL SIGNAL

(71) Applicants: CENTRE NATIONAL DE LA RECHERCHE SCIENTIFIQUE, Paris (FR); UNIVERSITE DE FRANCHE COMTE, Besancon (FR)

(72) Inventors: Jean-Charles Beugnot, Boulot (FR); Jacques Chretien, Serre les Sapins (FR); Adrien Godet, Pirey (FR)

(73) Assignees: CENTRE NATIONAL DE LA RECHERCHE SCIENTIFIQUE, Paris (FR); UNIVERSITE DE FRANCHE COMTE, Besancon (FR)

( * ) Notice: Subject to any disclaimer, the term of this patent is extended or adjusted under 35 U.S.C. 154(b) by 243 days.

(21) Appl. No.: 17/765,671

(22) PCT Filed: Oct. 12, 2020

(86) PCT No.: PCT/EP2020/078541
§ 371 (c)(1),
(2) Date: Mar. 31, 2022

(87) PCT Pub. No.: WO2021/074049
PCT Pub. Date: Apr. 22, 2021

(65) Prior Publication Data
US 2022/0397722 A1  Dec. 15, 2022

(30) Foreign Application Priority Data

Oct. 18, 2019  (EP) ..................... 19306356

(51) Int. Cl.
*G02B 6/28*  (2006.01)
*G02B 6/30*  (2006.01)

(52) U.S. Cl.
CPC ........... *G02B 6/2861* (2013.01); *G02B 6/305* (2013.01)

(58) Field of Classification Search
CPC ............................. G02B 6/2861; G02B 6/305
See application file for complete search history.

(56) References Cited

U.S. PATENT DOCUMENTS 5,140,651 A * 8/1992 Soref .................... G02F 1/2257
   359/260
2019/0049675 A1  2/2019 Fotoniki et al.

FOREIGN PATENT DOCUMENTS

CN    107229138 A    10/2017
WO    2019183953 A1   10/2019

OTHER PUBLICATIONS

Kang et al., "Fabrication of Precision Fiber-Optic Time Delays with in situ Monitoring for Subpicosecond Accuracy", Appl. Opt. vol. 36, No. 12, Apr. 20, 1997, pp. 2533-2536 (4 pgs.) (Year: 1997).*

(Continued)

*Primary Examiner* — Daniel Petkovsek
(74) *Attorney, Agent, or Firm* — Maier & Maier, PLLC

(57) ABSTRACT

A process for delaying a useful optical signal (P1) having a wavelength value λ between 0.2 μm and 3 μm, with respect to a reference optical signal (P2) having the same wavelength value λ. The process includes having the useful optical signal propagate along a tapered fiber portion. A length of the tapered fiber portion can be varied using stretching means that are light, less cumbersome and less expensive compared to those necessary for a standard optical fiber. In addition, the delay value which is effective for the useful optical signal can be varied over a wide range. Such process can be useful for interferometry measurements in particular.

18 Claims, 2 Drawing Sheets

(56) References Cited

OTHER PUBLICATIONS

Adrien Godet et al., "Tensile strain dependence of Brillouin scattering in tapered optical fibers"; 2017 Conference on Lasers and Electro-Optics Europe & European Quantum Electronics Conference; Jun. 25-29, 2017; ISBN: 978-1-5090-6736-7; 1 page.

Adrien Godet et al., "Observation of elastic anisotropy in strained optical nanofibers using Brillouin spectroscopy"; 2019 Conference on Lasers and Electro-Optics Europe & European Quantum Electronics Conference; Jun. 23-27, 2019; 1 page.

International Search Report and Written Opinion of the International Searching Authority mailed on Nov. 4, 2020, in corresponding International Application No. PCT/EP2020/078541; 8 pages.

* cited by examiner

PROCESS FOR DELAYING AN OPTICAL SIGNAL

FIELD

The present specification relates to a process for delaying an optical signal, and a device suitable for implementing such process.

BACKGROUND

Delaying a useful optical signal before mixing it with a reference optical signal that has a wavelength value common with the useful optical signal is implemented for many applications, in particular for communication applications, optical sensor applications, power beam synthesis, etc. Interference is thus produced, and features of this interference including interference pattern or intensity are constant over time when the delay applied to the useful optical signal with respect to the reference optical signal is constant. Common practical implementation consists in splitting an initial optical signal into two parts, forming respectively the useful optical signal and the reference optical signal, then having at least one of the useful and reference optical signals be altered so that its phase contains a useful information, and thereafter making the useful and reference optical signals to interfere with one another to extract the useful information. Obviously, the interference features become varying over time when the alteration of the useful and/or reference optical signal is time-varying, and/or the delay applied to the useful optical signal is time-varying.

In particular, it is known delaying an optical signal by making it propagate within an optical fiber, and varying the delay which is thus produced by modifying the length of the optical fiber. The optical fiber is varied elastically in length by stretching it using any appropriate system. Typically, a force of about 35 N (Newton) is necessary for increasing the optical fiber length by 1%, in particular when the optical fiber is of single mode type. In such conditions, a 15 meter-long fiber is necessary for obtaining a delay increase of 1 ns (nanosecond), using a tension of about 35 N applied to the optical fiber for stretching it. But such value for the tension requires tension production means which are complex, cumbersome, heavy and expensive. For example, a tension value of 35 N requires implementing a voltage of the order of 1 kV (kilovolt) when using a piezoelectric system for stretching the optical fiber. This necessitates using a large DC-voltage source.

Technical Problem

Starting from this situation, the present invention aims at delaying an optical signal in a simple manner, which can be implemented more easily and at lower price than prior art.

SUMMARY

To this end, a first aspect of the invention proposes a process for delaying a useful optical signal having a wavelength value $\lambda$ comprised between 0.2 µm (micrometer) and 3 µm, with respect to a reference optical signal having the same wavelength value $\lambda$, this process comprising the following actions which are performed simultaneously:

causing the useful optical signal to propagate in an optical fiber, between two opposite ends of this optical fiber, whereas the reference optical signal does not propagate in the optical fiber;

causing at least a part of the useful optical signal that has propagated in the optical fiber without change in the wavelength value of this part of the useful optical signal, to mix with the reference optical signal, so that a stationary optical intensity produced by the optical signal mixing depends on a delay which is effective for the part of the useful optical signal due to propagation time in the optical fiber; and adjusting a length of the optical fiber through elastic stretching of this optical fiber, so as to produce a selected value for the delay due to the propagation time of the part of the useful optical signal in the optical fiber, or so as to obtain a selected value for the stationary optical intensity produced by the optical signal mixing.

According to the invention, a portion of the optical fiber which is comprised between both ends of this optical fiber, is a tapered fiber portion having a diameter comprised between $\lambda/3$ and 10 µm, so that a ratio ($\Delta L/L$)/T is comprised between 20%/N and $4 \cdot 10^5$%/N, where L is a length of the tapered fiber portion, T is a tension applied to the optical fiber between both ends thereof for stretching elastically the tapered fiber portion, $\Delta L$ is an elastic lengthening of the tapered fiber portion caused by the tension T, and $\Delta L/L$ being the lengthening ratio expressed as a percentage value.

A tapered fiber portion can be obtained from an optical fiber, in particular a single mode optical fiber, by heating it up to the glass transition temperature and simultaneously stretching the optical fiber so that its diameter is reduced to less than 10 µm. After being processed in this way, the tapered fiber portion no longer has separate core and cladding, but it consists of a continuous transparent medium which still allows guided propagation of the useful optical signal thanks to the refractive index difference that exists at the peripheral interface of the tapered fiber portion with an external medium such as air. Each end portion of the optical fiber may not be tapered, so that the guided propagation of the useful optical signal undergoes adiabatic transition between each optical fiber end portion and the tapered fiber portion.

Thanks to using a tapered fiber portion, the ratio ($\Delta L/L$)/T which is the inverse of the Young's modulus can be higher, so that the tension value that is necessary for producing a desired lengthening value for the optical fiber is reduced. For example, a lengthening $\Delta L/L$ of about 6% can be produced with a tension T of about 1 mN (milliNewton) applied to the tapered fiber portion. Such reduced tension value can be produced using less complex stretching means, in particular means which are light in weight, and/or less cumbersome and/or less expensive, compared to those necessary for producing a same lengthening value but for a standard optical fiber.

The following particulars or improvements of the invention may further be implemented, separately or in combination of several of them:

the ratio ($\Delta L/L$)/T may be higher than 1.0%/N, preferably higher than $10^2$%/N;

the tension which is applied to the optical fiber between both ends thereof for stretching elastically the tapered fiber portion, may be comprised between $10^{-6}$ N and $10^{-1}$ N, preferably between $7 \cdot 10^{-5}$ N and $10^{-2}$ N;

the lengthening ratio $\Delta L/L$ of the tapered fiber portion being stretched elastically may be comprised between 1% and 6%;

the length L of the tapered fiber portion may be comprised between $10^{-3}$ m (meter) and 1 m, preferably between $5 \cdot 10^{-3}$ m and 0.5 m;

the delay due to the propagation time of the part of the useful optical signal in the optical fiber when the tapered fiber portion is stretched elastically, may be comprised between 0.1 ps and 200 ps, preferably between 1 ps and 100 ps, when compared to propagation in the optical fiber with the tapered fiber portion unstretched;

the optical fiber may be comprised of an optical fiber core surrounded by an optical fiber cladding, and further surrounded by a polymer-based coating, in fiber pigtail portions of the optical fiber apart from the tapered fiber portion, and the tapered fiber portion may be devoid of polymer-based coating and formed by a blend of respective materials of the optical fiber core and optical fiber cladding;

the tapered fiber portion may have a diameter of less than 5 μm;

the tapered fiber portion may be enclosed within a container, preferably a sealed container; and the lengthening of the tapered fiber portion may be produced by a stretching system based on a piezoelectric actuator, and/or based on a micrometer screw, that is connected to at least one of both ends of the optical fiber.

Generally for the invention, the process may further comprise:

using the part of the useful optical signal that has propagated in the optical fiber without change in its wavelength value $\lambda$, or the reference optical signal, for at least one application selected in the list comprised of interferometry, in particular quantum interferometry, signal delaying or synchronization, signal transmission, in particular optical telecommunication, laser beam shaping, in particular power laser beam synthesis, optical oscillator design, imaging, in particular optical coherence tomography, ultra-fast optoelectronics, cryptography, and light source design for spectrophotometry analysis.

A second aspect of the invention proposes a device which is adapted for delaying a useful optical signal having a wavelength value $\lambda$ comprised between 0.2 μm and 3 μm, which device comprises:

an optical fiber which extends between two ends thereof;

means for injecting the useful optical signal into the optical fiber, and means for recovering at least a part of the useful optical signal that has propagated in the optical fiber without change in wavelength value;

means for adjusting a length of the optical fiber through elastic stretching of this optical fiber, so as to produce a selected value for a delay which is effective for the part of the useful optical signal due to propagation time of this part of the useful optical signal in the optical fiber; and means for mixing the part of the useful optical signal that has propagated in the optical fiber without change in its wavelength value, with a reference optical signal that has the same wavelength value $\lambda$ as the useful optical signal, so that a stationary optical intensity produced by the optical signal mixing depends on the delay which is effective for the part of the useful optical signal due to the propagation time in the optical fiber.

In the invention device, a portion of the optical fiber which is comprised between both ends thereof, is a tapered fiber portion having a diameter comprised between 0.067 μm and 10 μm, so that a ratio $(\Delta L/L)/T$ is comprised between 20%/N and $4 \cdot 10^5$%/N, where L is a length of the tapered fiber portion, T is a tension to be applied to the optical fiber between both ends thereof for stretching elastically the tapered fiber portion, $\Delta L$ is an elastic lengthening of the tapered fiber portion caused by the tension T, and $\Delta L/L$ being the lengthening ratio expressed as a percentage value.

In particular, such invention device may be part of an interferometer, in particular a quantum interferometer, a signal delaying device, a signal transmission device, in particular an optical telecommunication device, a laser beam shaping device, in particular a power laser beam synthesis device, an optical oscillator, an imaging device, in particular an optical coherence tomography device, an ultra-fast optoelectronic device, a cryptography device, and a lighting source for spectrophotometry analysis.

BRIEF DESCRIPTION OF THE DRAWINGS

These and other features and benefits of the present invention will appear more clearly from the below not-limiting detailed description of several implementations, with reference to the following appended drawings.

DETAILED DESCRIPTION

For clarity sake, element sizes which appear in these drawings do not correspond to actual dimensions or dimension ratios. Also, same reference numbers which are indicated in different ones of the figures denote identical elements of elements with identical function. Without further indication, temperature of all optical fiber portions considered hereafter is room temperature, for example equal to 25° C. All wavelength values indicated thereafter refer to light propagating in free space, with same frequency value as for the guided mode(s) considered.

Figure 1A:
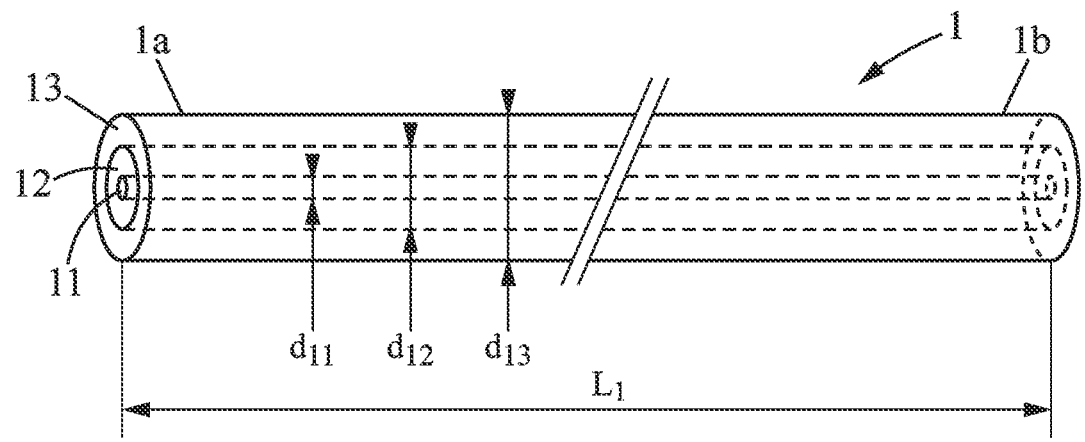
FIG. 1a is a schematic representation of an optical fiber.

With reference to FIG. 1a, an optical fiber 1 extends between two opposite ends thereof, with respective reference numbers 1a and 1b. The optical fiber 1 is designed for guiding light with wavelength comprised between 0.2 μm and 3 μm. In a usual way, the optical fiber 1 has a core 11 with core diameter $d_{11}$, a cladding 12 with cladding diameter $d_{12}$ and a coating 13 with external diameter $d_{13}$. The core 11 and the cladding 12 are comprised of doped glass material with respective suitable doping elements and concentrations, and the coating 13 may be of polymer material, for example acrylate-based organic material. The diameters $d_{11}$, $d_{12}$ and $d_{13}$ may be of about 9 μm, 125 μm and 250 μm, respectively. Such optical fiber may suit for telecommunication applications at wavelength of about 1.5 μm, for example. $L_1$ denotes the length of the optical fiber 1 between both ends 1a and 1b.

Such optical fiber designed for telecommunication applications, as commercially available, has a lengthening ratio of about 1% when submitted to a tension T of 35 N. The lengthening ratio is defined as $\Delta L_1/L_1$, where $\Delta L_1$ is the length increase of the optical fiber 1 when submitted to the tension T between both ends 1a and 1b, compared to the value of the length $L_1$ when no tension is applied. This leads to a value for the ratio $(\Delta L_1/L_1)/T$ of about $2.9 \cdot 10^{-2}$%/N. In such conditions, for light wavelength equal to 1.550 μm, the respective refractive index values of the core 11 and cladding 12 equal to about 1.45 and 1.44, $L_1$ equal to 15 m, the tension T equal to 35 N, the propagation time of the light from the optical fiber end 1a to the optical fiber end 1b is increased by 1 ns when compared to the propagation time without tension applied between both optical fiber ends 1a and 1b. If the tension T is produced using a piezoelectric-based system, the voltage value necessary to be implemented may be as high as 1 kV (kilovolt). If tension is applied to the optical fiber 1 in view of obtaining a value of about 2% for the lengthening ratio ($\Delta L_1/L_1$), the optical fiber 1 breaks.

Figure 1B:
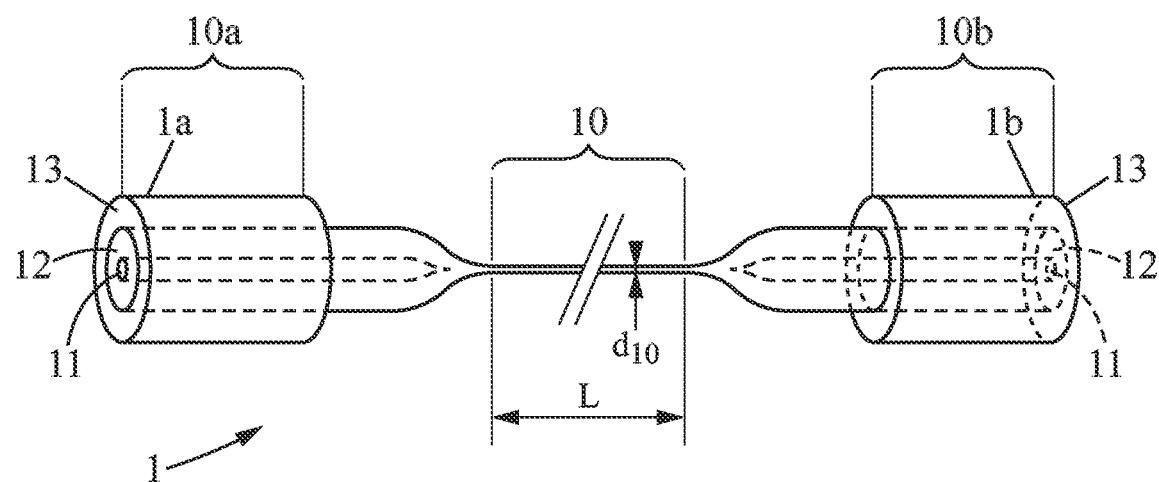
FIG. 1b is a schematic representation of an optical fiber including a tapered fiber portion.

FIG. 1b shows a modified optical fiber to be used for the invention, which may be obtained from the optical fiber 1 of FIG. 1a. The coating 13 is removed in a portion of the optical fiber 1 intermediate between both ends 1a and 1b, using any process known in the art for such removal, including selective firing of the organic coating material. Then, the optical fiber 1 is stretched in this portion devoid of coating 13 by applying a suitable tension to the optical fiber portion and locally heating it up to the glass transition temperature. In a known manner, a tapered fiber portion 10 is produced in this way, with diameter of less than 10 µm, for example equal to 1 µm. L and $d_{10}$ denote the diameter and length of this tapered fiber portion 10, respectively. Residual untapered optical fiber portions 10a and 10b remain between the optical fiber ends 1a and 1b respectively and the tapered fiber portion 10. In a known manner, the material of the tapered fiber portion 10 is a blend of the respective glass compositions of the core 11 and cladding 12, and light with wavelength λ which can propagate in the optical fiber 1, in particular in the untapered optical fiber portions 10a and 10b, can also propagate according to a special guided mode along the tapered fiber portion 10. This special guided mode is based on the refractive index difference which exists at the peripheral interface of the tapered fiber portion 10 with air. For this purpose, the diameter $d_{10}$ of the tapered fiber portion 10 must be larger than λ/3, otherwise guided light propagation along this portion 10 is no longer possible. The lower limit λ/3 for the diameter $d_{10}$ equals to about 0.52 µm when λ=1.550 µm. An adiabatic propagation mode transition occurs between the untapered optical fiber portion 10a and the tapered fiber portion 10, and then between the tapered fiber portion 10 and the untapered optical fiber portion 10b, so that light with wavelength value λ which is injected in the modified optical fiber 1 at the fiber end 1a is recovered at the fiber end 1b without modification in the wavelength value after having propagated successively along the untapered optical fiber portion 10a, the tapered fiber portion 10 and then the untapered optical fiber portion 10b.

When the tapered fiber portion 10 is 1 µm in diameter ($d_{10}$=1 µm) and 0.3 m in length (L=0.3 m), and has been obtained from the optical fiber 1 described with reference to FIG. 1a, the ratio ($\Delta L/L$)/T of the tapered fiber portion 10 is of about $4 \cdot 10^5$%/N. This means that a value of about 6% is obtained for the lengthening ratio ($\Delta L/L$) when the tension T is of about 1 mN (milliNewton). Lower values for the ratio ($\Delta L/L$)/T can be obtained for higher $d_{10}$-values, while remaining less than the original value of the ratio ($\Delta L_1/L_1$)/T which is effective for the untapered optical fiber 1. Obviously, the lengthening of the untapered optical fiber portions 10a and 10b is negligible compared to that of the tapered fiber portion 10 in the modified optical fiber of FIG. 1b.

Figure 2:
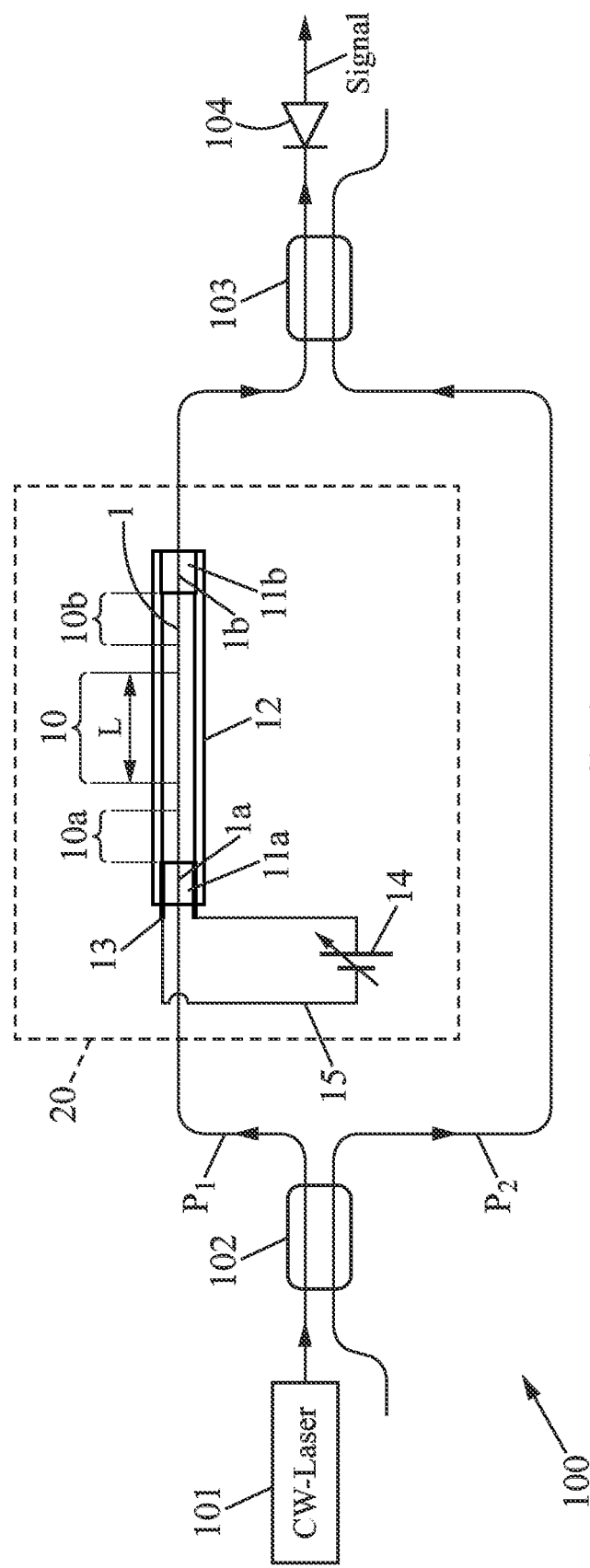
FIG. 2 illustrates an application of the optical fiber of FIG. 1b in accordance with the invention.

FIG. 2 represents the main components of an interferometer device 100 which comprises the modified optical fiber 1 of FIG. 1b. Both optical fiber ends 1a and 1b are firmly held using clamps 11a and 11b which are maintained apart from each other by any intermediate mechanical means, for example a rigid tube 12 which extends parallel to the modified optical fiber 1 and surrounds this latter. The clamp 11b may be fixed with respect to the tube 12, whereas the clamp 11a may be connected to the tube 12 using an intermediate mobile system 13. Such mobile system 13 is arranged for shifting the optical fiber end 1a parallel to the fiber axis, away from the optical fiber end 1b. It thus applies a tension T to the modified optical fiber 1, thereby producing a lengthening of this latter. The intermediate mobile system 13 corresponds to the means for adjusting the length of the optical fiber mentioned in the general part of this description. It may be embodied by any practical means known in the art. For example, the intermediate mobile system 13 may be based on a piezoelectric material portion, which is combined with a variable DC-source 14 using appropriate electrical connections 15, including electrodes which are arranged on the piezoelectric material portion. Advantageously, the tube 12, the clamps 11a and 11b and the intermediate mobile system 13 form a sealed container suitable for avoiding pollutants and/or dust particles to reach the surface of the tapered fiber portion 10. Reference number 20 denotes such fiber stretching system as a whole, which is suitable for stretching elastically the tapered fiber portion 10. When dimensioning the modified optical fiber 1 as indicated above with respect to FIG. 1b, having the DC-source 14 produce a voltage value of several volts but less than 30 V may be sufficient for increasing by 50 ps the propagation time of light in the modified optical fiber 1, between both fiber ends 1a and 1b.

Alternatively, the fiber stretching system 20 may be based on a micrometer screw, for example such micrometer screw rotated by a stepper.

The other components of the interferometer device 100 are the following ones, for example for forming an all-fiber connected device:

101: light source, for example a continuous wave laser or a pulsed laser operating at wavelength value of 1550 nm (nanometer), denoted CW-laser, 102, 103: optical couplers, for example evanescent wave couplers, and 104: photodiode.

Appropriate fiber-type injection means are used for connecting optically the ends 1a and 1b of the modified optical fiber 1 to other parts of the interferometer device 100. Conveniently, the untapered optical fiber portions 10a and 10b may form pigtail portions to be used for these optical connections. The optical coupler 103 forms the means for mixing a first part $P_1$ of the light produced by the source 101 that has propagated in the modified optical fiber 1, including the tapered fiber portion 10, with a second part $P_2$ of the light produced by the source 1 that has been transmitted by the optical coupler 102 to the optical coupler 103 without travelling along the modified optical fiber 1. In the general part of the present description, the part $P_1$ of light that propagates in the modified optical fiber 1 has been called useful optical signal, and the part $P_2$ of light that does not propagate in the modified optical fiber 1 has been called reference optical signal.

The operation of such interferometer device 100 is well known. The electrical signal which is outputted by the photodiode 104 reflects a path phase difference that exists between the first part $P_1$ and second part $P_2$ of the light produced by the source 101. This phase difference depends in turn on the light propagation delay which is produced in the modified optical fiber 1 when non-zero voltage is supplied by the variable DC-source 14. Depending on the application of the device 100, the second part $P_2$ of the light produced by the source 101 may be delayed by an unknown time amount selectively with respect to the first part $P_1$, by an optical application system (not shown) which is located on the optical path between the optical couplers 102 and 103. Then, varying and measuring the voltage produced by the DC-source 14 until obtaining a maximum value for the electrical signal which is outputted by the photodiode 104 constitutes a measurement of the unknown delay which is undergone by the second light part $P_2$ in the optical application system.

In other applications of the device 100 when used with a light source 101 of pulsed laser type, the stretching system 20 may be controlled in open loop for applying a desired delay value to the first part $P_1$ of the light produced by the source 101. The desired delay value is selected through appropriate setting of the variable DC-source 14.

It should be understood that the invention may be reproduced while modifying several secondary aspects of the examples which have been described in detail above. In particular, all numeral values relating to the embodiments described have been provided only for exemplifying purpose and do not constitute any limitation.

The invention claimed is:

1. A process for delaying a useful optical signal having a wavelength value λ comprised between 0.2 μm and 3 μm, with respect to a reference optical signal having the same wavelength value λ, comprising the following actions which are performed simultaneously:
    causing the useful optical signal to propagate in an optical fiber, between two opposite ends of said optical fiber, whereas the reference optical signal does not propagate in said optical fiber;
    causing at least a part of the useful optical signal that has propagated in the optical fiber without change in the wavelength value of said part of the useful optical signal, to mix with the reference optical signal, so that a stationary optical intensity produced by the optical signal mixing depends on a delay which is effective for the part of the useful optical signal due to propagation time in the optical fiber; and
    adjusting a length of the optical fiber through elastic stretching of said optical fiber, so as to produce a selected value for the delay due to the propagation time of the part of the useful optical signal in the optical fiber, or so as to obtain a selected value for the stationary optical intensity produced by the optical signal mixing,
    wherein a portion of the optical fiber which is comprised between both ends of said optical fiber, is a tapered fiber portion having a diameter comprised between λ/3 and 10 μm, so that a ratio (ΔL/L)/T is comprised between 20%/N and $4·10^5$%/N, where L is a length of the tapered fiber portion, T is a tension applied to the optical fiber between both ends thereof for stretching elastically the tapered fiber portion, ΔL is an elastic lengthening of said tapered fiber portion caused by the tension T, and ΔL/L being the lengthening ratio expressed as a percentage value.

2. The process of claim 1, wherein the ratio (ΔL/L)/T is higher than 1.0%/N.

3. The process of claim 2, wherein the ratio (ΔL/L)/T is higher than $10^2$%/N.

4. The process of claim 1, wherein the tension which is applied to the optical fiber between both ends thereof for stretching elastically the tapered fiber portion, is comprised between $10^{-6}$ N and $10^{-1}$ N.

5. The process of claim 4, wherein the tension which is applied to the optical fiber between both ends thereof for stretching elastically the tapered fiber portion, is comprised between $7·10^{-5}$ N and $10^{-2}$ N.

6. The process of claim 4, wherein the lengthening ratio ΔL/L of the tapered fiber portion being stretched elastically is comprised between 1% and 6%.

7. The process of claim 4, wherein the length L of the tapered fiber portion is comprised between $5·10^{-3}$ m and 0.5 m.

8. The process of claim 1, wherein the length L of the tapered fiber portion is comprised between $10^{-3}$ m and 1 m.

9. The process of claim 1, wherein the delay due to the propagation time of the part of the useful optical signal in the optical fiber when the tapered fiber portion is stretched elastically, is comprised between 0.1 ps and 200 ps, when compared to propagation in the optical fiber with the tapered fiber portion unstretched.

10. The process of claim 9, wherein the delay due to the propagation time of the part of the useful optical signal in the optical fiber when the tapered fiber portion is stretched elastically, is comprised between 1 ps and 100 ps, when compared to propagation in the optical fiber with the tapered fiber portion unstretched.

11. The process of claim 1, wherein the optical fiber is comprised of an optical fiber core surrounded by an optical fiber cladding, and further surrounded by a polymer-based coating, in fiber pigtail portions of said optical fiber apart from the tapered fiber portion, and the tapered fiber portion is devoid of polymer-based coating and is formed by a blend of respective materials of the optical fiber core and optical fiber cladding.

12. The process of claim 1, wherein the tapered fiber portion has a diameter of less than 5 μm.

13. The process of claim 1, wherein the tapered fiber portion is enclosed within a container.

14. The process of claim 13, wherein the container is a sealed container.

15. The process of claim 1, wherein the lengthening of the tapered fiber portion is produced by a stretching system based on a piezoelectric actuator, or based on a micrometer screw, that is connected to at least one of both ends of the optical fiber.

16. The process of claim 1, further comprising:
    using the part of the useful optical signal that has propagated in the optical fiber without change in the wavelength value λ of said part of the useful optical signal, or the reference optical signal, for at least one application selected from the group consisting of interferometry, signal delaying or synchronization, signal transmission, laser beam shaping, optical oscillator design, imaging, ultra-fast optoelectronics, cryptography, and light source design for spectrophotometry analysis.

17. The process of claim 1, further comprising:
    using the part of the useful optical signal that has propagated in the optical fiber without change in the wavelength value λ of said part of the useful optical signal, or the reference optical signal, for at least one application from the group consisting of quantum interferometry, optical telecommunication, power laser beam synthesis, and optical coherence tomography.

18. A device adapted for delaying a useful optical signal having a wavelength value λ comprised between 0.2 μm and 3 μm, said device comprising:
    an optical fiber extending between two ends of said optical fiber;
    means for injecting the useful optical signal into the optical fiber, and means for recovering at least a part of the useful optical signal that has propagated in the optical fiber without change in the wavelength value of said part of the useful optical signal;

means for adjusting a length of the optical fiber through elastic stretching of said optical fiber, so as to produce a selected value for a delay which is effective for the part of the useful optical signal due to propagation time of said part of the useful optical signal in the optical fiber; and means for mixing the part of the useful optical signal that has propagated in the optical fiber without change in the wavelength value of said part of the useful optical signal, with a reference optical signal that has the same wavelength value $\lambda$ as the useful optical signal, so that a stationary optical intensity produced by the optical signal mixing depends on the delay which is effective for the part of the useful optical signal due to the propagation time in the optical fiber, wherein a portion of the optical fiber which is comprised between both ends of said optical fiber, is a tapered fiber portion having a diameter comprised between 0.067 μm and 10 μm, so that a ratio $(\Delta L/L)/T$ is comprised between 20%/N and $4 \cdot 10^5$%/N, where L is a length of the tapered fiber portion, T is a tension to be applied to the optical fiber between both ends thereof for stretching elastically the tapered fiber portion, $\Delta L$ is an elastic lengthening of said tapered fiber portion caused by the tension T, and $\Delta L/L$ being the lengthening ratio expressed as a percentage value.

\* \* \* \* \*